(12) United States Patent
Fang et al.

(10) Patent No.: US 8,943,597 B2
(45) Date of Patent: *Jan. 27, 2015

(54) SYSTEMS AND METHODS FOR UPDATING CONTENT DETECTION DEVICES AND SYSTEMS

(71) Applicant: Fortinet, Inc., Sunnyvale, CA (US)

(72) Inventors: Yu Fang, Burnaby (CA); Michael Xie, Menlo Park, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,292

(22) Filed: Nov. 5, 2013

(65) Prior Publication Data

US 2014/0059689 A1 Feb. 27, 2014

Related U.S. Application Data

(63) Continuation of application No. 13/795,407, filed on Mar. 12, 2013, which is a continuation of application No. 13/546,915, filed on Jul. 11, 2012, which is a continuation of application No. 13/240,661, filed on Sep. 22, 2011, now Pat. No. 8,276,205, which is a continuation of application No. 11/000,703, filed on Nov. 30, 2004, now Pat. No. 8,051,483.

(60) Provisional application No. 60/552,457, filed on Mar. 12, 2004.

(51) Int. Cl.
*G06F 11/30* (2006.01)
*H04L 29/06* (2006.01)
*G06F 21/56* (2013.01)

(52) U.S. Cl.
CPC ........ *H04L 63/1425* (2013.01); *H04L 63/0227* (2013.01); *H04L 63/1441* (2013.01); *G06F 21/567* (2013.01); *H04L 63/02* (2013.01); *H04L 63/1408* (2013.01); *H04L 63/1416* (2013.01)
USPC .......................................................... 726/24

(58) Field of Classification Search
None
See application file for complete search history.

(56) References Cited

U.S. PATENT DOCUMENTS

| | | | |
|---|---|---|---|
| 6,035,423 A * | 3/2000 | Hodges et al. | 714/38.1 |
| 6,052,531 A | 4/2000 | Waldin, Jr. et al. | |
| 6,233,618 B1 * | 5/2001 | Shannon | 709/229 |
| 6,269,456 B1 | 7/2001 | Hodges et al. | |
| 6,314,565 B1 | 11/2001 | Kenner et al. | |
| 6,651,249 B2 | 11/2003 | Waldin et al. | |
| 6,725,377 B1 | 4/2004 | Kouznetsov | |
| 6,804,778 B1 | 10/2004 | Levi et al. | |
| 6,880,086 B2 | 4/2005 | Kidder et al. | |
| 7,080,000 B1 | 7/2006 | Cambridge | |
| 7,159,036 B2 | 1/2007 | Hinchliffe et al. | |

(Continued)

OTHER PUBLICATIONS

U.S. Appl. No. 11/000,703, Advisory Action mailed Jul. 14, 2008, 3 pgs.

(Continued)

*Primary Examiner* — Gilberto Barron, Jr.
*Assistant Examiner* — Devin Almeida
(74) *Attorney, Agent, or Firm* — Schwegman Lundberg & Woessner, P.A.

(57) ABSTRACT

Systems, methods, and software for processing received network traffic in view of content detection data and configuration data that defines policies to either block, permit, or to further evaluate network traffic content on the policies when network traffic is entering a network.

16 Claims, 2 Drawing Sheets

(56) References Cited

U.S. PATENT DOCUMENTS

| | | | |
|---|---|---|---|
| 7,181,765 B2* | 2/2007 | Patel et al. | 726/12 |
| 7,185,332 B1 | 2/2007 | Waldin et al. | |
| 7,210,168 B2 | 4/2007 | Hursey et al. | |
| 7,389,539 B1 | 6/2008 | Kouznetsov | |
| 7,398,553 B1 | 7/2008 | Li | |
| 7,401,359 B2 | 7/2008 | Gartside et al. | |
| 7,424,706 B2 | 9/2008 | Ivanov et al. | |
| 7,478,381 B2 | 1/2009 | Roberts et al. | |
| 7,761,503 B2 | 7/2010 | Dhawan et al. | |
| 7,769,815 B2 | 8/2010 | Wang et al. | |
| 7,844,708 B2 | 11/2010 | Willehadson et al. | |
| 7,937,697 B2 | 5/2011 | Alberti et al. | |
| 8,051,483 B2 | 11/2011 | Fang et al. | |
| 8,056,135 B2 | 11/2011 | Fang et al. | |
| 8,276,205 B2 | 9/2012 | Xie et al. | |
| 2002/0013832 A1 | 1/2002 | Hubbard | |
| 2002/0100036 A1 | 7/2002 | Moshir et al. | |
| 2002/0124181 A1 | 9/2002 | Nambu | |
| 2003/0079145 A1 | 4/2003 | Kouznetsov et al. | |
| 2003/0123465 A1* | 7/2003 | Donahue | 370/401 |
| 2003/0177485 A1 | 9/2003 | Waldin et al. | |
| 2004/0003266 A1 | 1/2004 | Moshir et al. | |
| 2004/0030913 A1 | 2/2004 | Liang et al. | |
| 2005/0091653 A1 | 4/2005 | Willehadson et al. | |
| 2005/0120229 A1 | 6/2005 | Lahti | |
| 2005/0144616 A1 | 6/2005 | Hammond et al. | |
| 2005/0204151 A1 | 9/2005 | Fang et al. | |
| 2010/0154064 A1 | 6/2010 | Fang et al. | |
| 2012/0017277 A1 | 1/2012 | Fang et al. | |
| 2012/0278896 A1 | 11/2012 | Fang et al. | |
| 2013/0263246 A1 | 10/2013 | Fang et al. | |
| 2014/0068749 A1 | 3/2014 | Fang et al. | |

OTHER PUBLICATIONS

U.S. Appl. No. 11/000,703, Final Office Action mailed Apr. 3, 2009, 13 pgs.

U.S. Appl. No. 11/000,703, Final Office Action mailed Apr. 7, 2008, 18 pgs.

U.S. Appl. No. 11/000,703, Final Office Action mailed Jun. 29, 2010, 8 pgs.

U.S. Appl. No. 11/000,703, Non Final Office Action mailed Nov. 14, 2007, 16 pgs.

U.S. Appl. No. 11/000,703, Non-Final Office Action mailed Sep. 19, 2008, 3 pgs.

U.S. Appl. No. 11/000,703, Non-Final Office Action mailed Oct. 14, 2010, 8 pgs.

U.S. Appl. No. 11/000,703, Non-Final Office Action mailed Dec. 15, 2009, 16 pgs.

U.S. Appl. No. 11/000,703, Notice of Allowance mailed Jun. 27, 2011, 12 pgs.

U.S. Appl. No. 11/000,703, Notice of Allowance mailed Aug. 8, 2011, 5 pgs.

U.S. Appl. No. 11/000,703, Response filed Jan. 15, 2008 to Non Final Office Action mailed Nov. 14, 2007, 13 pgs.

U.S. Appl. No. 11/000,703, Response filed Apr. 8, 2011 to Non-Final Office Action mailed Oct. 14, 2010, 8 pgs.

U.S. Appl. No. 11/000,703, Response filed Apr. 15, 2010 to Non Final Office Action mailed Dec. 15, 2009, 10 pgs.

U.S. Appl. No. 11/000,703, Response filed Jul. 7, 2008 to Final Office Action mailed Apr. 7, 2008, 10 pgs.

U.S. Appl. No. 11/000,703, Response filed Sep. 29, 2010 to Final Office Action mailed Jun. 29, 2010, 7 pgs.

U.S. Appl. No. 11/000,703, Response filed Dec. 2, 2009 to Final Office Action mailed Apr. 3, 2009, 9 pgs.

U.S. Appl. No. 11/000,703, Response filed Dec. 19, 2008 to Non-Final Office Action mailed Sep. 19, 2008, 9 pgs.

U.S. Appl. No. 12/639,800, Non Final Office Action mailed May 9, 2011, 11 pgs.

U.S. Appl. No. 12/639,800, Notice of Allowance mailed Aug. 22, 2011, 5 pgs.

U.S. Appl. No. 12/639,800, Response filed Jun. 28, 2011 to Non-Final Office Action Recieved May 9, 2011, 7 pgs.

U.S. Appl. No. 13/240,661, Response filed Jun. 1, 2012 to Non Final Office Action mailed May 3, 2012, 8 pgs.

U.S. Appl. No. 13/240,661, 312 Amendment filed Aug. 17, 2012, 3 pgs.

U.S. Appl. No. 13/240,661, Non Final Office Action mailed May 3, 2012, 10 pgs.

U.S. Appl. No. 13/240,661, Notice of Allowance mailed Jun. 13, 2012, 5 pgs.

U.S. Appl. No. 13/546,915, Preliminary Amendment filed Aug. 17, 2012, 3 pgs.

U.S. Appl. No. 13/795,407, Response filed Feb. 27, 2014 to Non Final Office Action mailed Nov. 27, 2014, 6 pgs.

U.S. Appl. No. 13/795,407, Non Final Office Action mailed Nov. 27, 2013, 10 pgs.

U.S. Appl. No. 13/795,407, Final Office Action mailed Jun. 6, 2014, 10 pgs.

U.S. Appl. No. 14/072,184, Non Final Office Action mailed Jul. 22, 2014, 8 pgs.

\* cited by examiner

SYSTEMS AND METHODS FOR UPDATING CONTENT DETECTION DEVICES AND SYSTEMS

RELATED APPLICATION DATA

This application is a Continuation of U.S. application Ser. No. 13/795,407, filed on Mar. 12, 2012, which is a Continuation of U.S. application Ser. No. 13/546,915, filed on Jul. 11, 2012, which is a Continuation of U.S. application Ser. No. 13/240,661, filed Sep. 22, 2011 and issued on Sep. 25, 2012 as U.S. Pat. No. 8,276,205, which is a Continuation of U.S. application Ser. No. 11/000,703, filed Nov. 30, 2004 and issued on Nov. 1, 2011 as U.S. Pat. No. 8,051,483, which claims priority to U.S. Provisional Patent Application No. 60/552,457, filed on Mar. 12, 2004, to each of which priority is claimed and the entire disclosures of which are expressly incorporated herein by reference.

BACKGROUND

1. Field of the Invention

The field of the invention relates to computer network and computer systems, and more particularly, to systems and methods for updating content detection modules.

2. Background

The generation and spreading of computer viruses are major problems in computer systems and computer networks. A computer virus is a program that is capable of attaching to other programs or sets of computer instructions, replicating itself, and/or performing unsolicited or malicious actions on a computer system. Viruses may be embedded in email attachments, files downloaded from Internet, and macros in MS Office files. The damage that can be done by a computer virus may range from mild interference with a program, such as a display of unsolicited messages or graphics, to complete destruction of data on a user's hard drive or server.

To provide protection from viruses, most organizations have installed virus scanning software on computers in their network. However, these organizations may still be vulnerable to a virus attack until every host in their network has received updated anti-virus software. With new attacks reported almost weekly, organizations are constantly exposed to virus attacks, and spend significant resources ensuring that all hosts are constantly updated with new antivirus information. For example, with existing content detection software, a user may have to request for a download of a new virus signature in order to enable the content detection software to detect new virus that has been created since the last update. If a user delays in downloading the new virus signature, the content detection software would be unable to detect the new virus. Also, with existing content detection systems, new virus signatures are generally not made available shortly after they are discovered. As such, a computer mat be subjected to attack by the new virus until the new virus signature is available and is downloaded by a user.

Besides virus attacks, many organizations also face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, the most popular solution for blocking unwanted web activity is to block access to a list of banned or blacklisted web sites and pages based on their URLs. However, as with virus scanning, the list of blocked URL requires constant updating. If a user delays in downloading the list of URL, or if the list of URL is not made available soon enough, the content detection software would be unable to detect undesirable content, such as web pages.

Many email spam elimination systems also use blacklists (spammer lists) to eliminate unwanted email messages. These systems match incoming email messages against a list of mail servers that have been pre-identified to be spam hosts, and prevent user access of messages from these servers. However, as with virus scanning, the spammer list also requires constant updating. If a user delays in downloading the spammer list, or if the spammer list is not made available soon enough, the content detection software would be unable to detect undesirable content.

SUMMARY

In accordance with some embodiments, a method of updating a content detection module includes obtaining content detection data, and transmitting the content detection data to a content detection module, wherein the transmitting is performed not in response to a request from the content detection module.

In accordance with other embodiments, a system for updating a content detection module includes means for obtaining content detection data, and means for transmitting the content detection data to a content detection module, wherein the means for transmitting is configured to perform the transmitting not in response to a request from the content detection module.

In accordance with other embodiments, a computer-program product having a medium, the medium having a set of instructions readable by a processor, an execution of the instructions by the processor causes a process to be performed, the process includes obtaining content detection data, and transmitting the content detection data to a content detection module, wherein the transmitting is performed not in response to a request from the content detection module.

In accordance with other embodiments, a content detection system includes a station having a computer-readable medium for storing content detection data, the content detection data usable by a content detection module to detect content, wherein the station is configured to transmit the content detection data not in response to a request by the content detection module.

In accordance with other embodiments, a method of sending content detection data includes determining whether a first update station received the content detection data, and sending the content detection data to the first update station if the first update station did not receive the content detection data.

In accordance with other embodiments, a system for sending content detection data includes means for determining whether a first update station received the content detection data, and means for sending the content detection data to the first update station if the first update station did not receive the content detection data.

In accordance with other embodiments, a computer-program product having a medium, the medium having a set of instructions readable by a processor, an execution of the instructions by the processor causes a process to be performed, the process includes determining whether a first update station received the content detection data, and sending the content detection data to the first update station if the first update station did not receive the content detection data.

In accordance with other embodiments, a method of sending content detection data includes obtaining content detection data, selecting an update station from a plurality of update stations, and sending the content detection data to the selected update station.

In accordance with other embodiments, a system for sending content detection data includes means for obtaining content detection data, means for selecting an update station from a plurality of update stations, and means for sending the content detection data to the selected update station.

In accordance with other embodiments, a computer-program product having a medium, the medium having a set of instructions readable by a processor, an execution of the instructions by the processor causes a process to be performed, the process includes obtaining content detection data, selecting an update station from a plurality of update stations, and sending the content detection data to the selected update station.

In accordance with other embodiments, a method of building a content detection system includes establishing a first communication link between a central station and an update station, the central station configured to transmit content detection data to the update station, and establishing a second communication link between the update station and a content detection module.

In accordance with other embodiments, a system for building a content detection system includes means for establishing a first communication link between a central station and an update station, the central station configured to transmit content detection data to the update station, and means for establishing a second communication link between the update station and a content detection module.

In accordance with other embodiments, a computer-program product having a medium, the medium having a set of instructions readable by a processor, an execution of the instructions by the processor causes a process to be performed, the process includes establishing a first communication link between a central station and an update station, the central station configured to transmit content detection data to the update station, and establishing a second communication link between the update station and a content detection module.

Other aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the application, in which similar elements are referred to by common reference numerals. In order to better appreciate how advantages and objects of various embodiments are obtained, a more particular description of the embodiments are illustrated in the accompanying drawings. Understanding that these drawings depict only typical embodiments of the application and are not therefore to be considered limiting its scope, the embodiments will be described and explained with additional specificity and detail through the use of the accompanying drawings.

DETAILED DESCRIPTION

Figure 1:
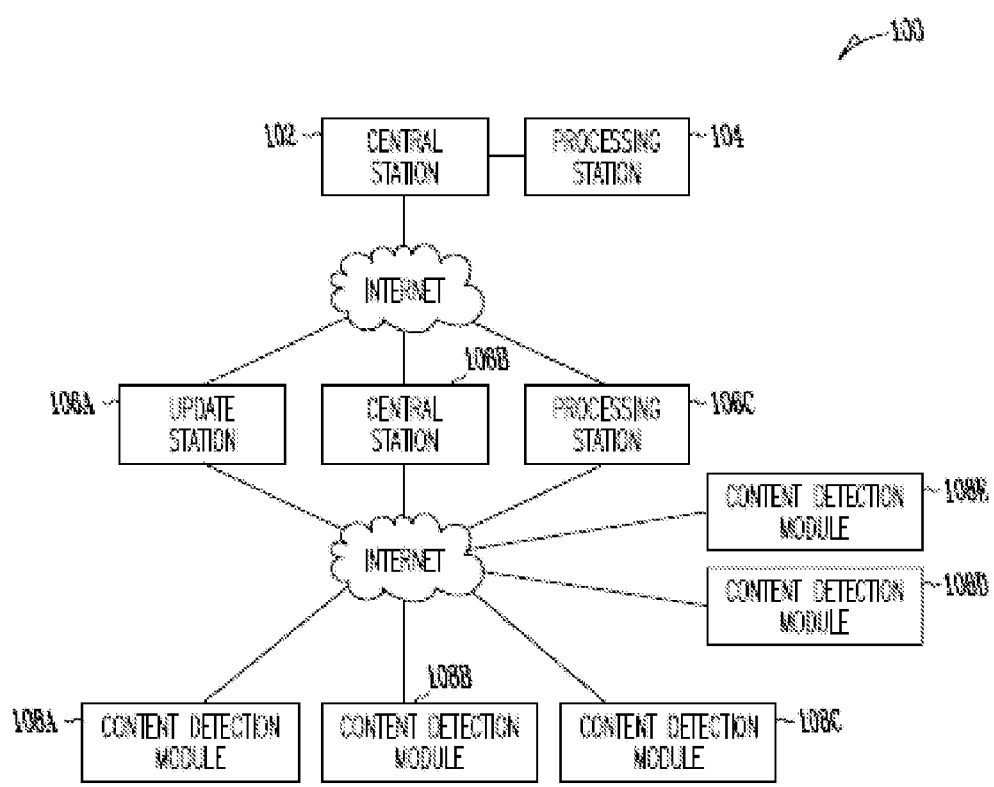
FIG. 1 illustrates a block diagram of a content detection system in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments. They are not intended as an exhaustive description of the invention or as a limitation on the scope of the invention. In addition, an illustrated embodiment may not show all aspects or advantages. An aspect or an advantage described in conjunction with a particular embodiment is not necessarily limited to that embodiment and can be practiced in any other embodiments, even if not so illustrated or described.

FIG. 1 illustrates a block diagram of a content detection system 100 in accordance with some embodiments. The content detection system 100 includes a central station 102, a processing station 104 for providing content detection data to the central station 102, a plurality of base stations 106 in communication with the central station 102, and a plurality of content detection modules 108 in communication with the base stations 106.

In the illustrated embodiments, processing station 104 is a computer. Alternatively, processing station 104 can be a server, a module, a device, a computer program, and the like, e.g., any one of a variety of devices that can receive and transmit information. Processing station 104 is configured to determine content detection data, such as a virus signature, a spammer identification, a URL, and the like, and transmit the content detection data to central station 102. For example, processing station 104 can be configured (e.g., programmed) to determine the content detection data using any of the techniques known in the art. Alternatively, the content detection data can be input into processing station 104 by a user of processing station 104. Although one processing station 104 is shown, in other embodiments, content detection system 100 can include more than one processing station 104 in communication with central station 102.

Central station 102 is configured to receive the content detection data from processing station 104, and send the content detection data to update stations 106 (e.g., through the Internet). In some embodiments, central station 102 also receives subscriber data, such as a user identification of a content detection module 108, level of protection desired by the user, etc., from processing station 104 or from update station(s) 106 for processing. In the illustrated embodiments, central station 102 is a computer, but alternatively, can be a server, a module, a device, a computer program, and the like, e.g., any one of a variety of devices that can receive and transmit information. Although one processing station 102 is shown, in other embodiments, content detection system 100 can include more than one central station 102, each of which in communication with at least one update station 106. In other embodiments, central station 102 and processing station 104 are combined and implemented as a single unit (e.g., a processor, a computer, or the like).

Update stations 106 receive the content detection data from central station 102, and send the content detection data to content detection modules 108 (e.g., through the Internet). Each of the update stations 106 is located at a geographical location that is different from others. For example, update station 106a may be located at a different building, a different street, a different city, or a different country, from update station 106b. In some embodiments, the update stations 106 also receives subscriber data, such as a user identification of a content detection module 108, level of protection desired by the user, etc., from content detection module(s) 108, and forward the subscriber data to central station 102 for processing. In other embodiments, update station 106 may be configured to handle requests (such as a subscriber's contract information, the latest update data, etc.) from content detection module(s) 108, collect information (such as the version information, IP address, geographical location of the detection module, etc.) from content detection module(s) 108, and forward collected information to central station 102. In the illustrated embodiments, each update station 106 is a computer, but alternatively, can be a server, a module, a device, a computer program, and the like, e.g., any one of a variety of devices that can receive and transmit information. In FIG. 1, three update stations 106a-106c and five content detection modules 108a-108e are shown. However, in alternative embodiments, the system 100 can have different numbers of update station(s) 106 and different numbers of content detection module(s) 108.

In the illustrated embodiments, each content detection module 108 is configured to receive electronic content (content data), and determines whether the electronic content contains undesirable content based on the content detection data it receives from update station 106. For example, content detection module 108 can be configured to detect virus based on a virus signature received from update station 106. In the illustrated embodiments, module 10 is implemented as a component of a gateway (or gateway product), which is configured to perform policy enforcement. As used in this specification, the term "policy enforcement" refers to a process or procedure, an execution of which creates a result that can be used to determine whether to pass data to user, and includes (but is not limited to) one or a combination of: source verification, destination verification, user authentication, virus scanning, content scanning (e.g., scanning for undesirable content), and intrusion detection (e.g., detecting undesirable content, such as worms, porno website, etc.). In other embodiments, instead of being a component of gateway, content detection module 108 can be a separate component that is coupled to gateway. In other embodiments, content detection module 108 can be a gateway product by itself.

In some embodiments, content detection module 108 can be implemented using software that is loaded onto a computer, a server, or other types of memory, such as a disk or a CD-ROM. Alternatively, content detection module 108 can be implemented as web applications. In alternative embodiments, content detection module 108 can be implemented using hardware. For example, in some embodiments, content detection module 108 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In still other embodiments, content detection module 108 can be any of a variety of circuits or devices capable of performing the functions described herein. For example, in alternative embodiments, content detection module 108 can include a general purpose processor, such as a Pentium processor. In other embodiments, content detection module 108 can be implemented using a combination of software and hardware. In some embodiments, content detection module 108 may be implemented as a firewall, a component of a firewall, or a component that is configured to be coupled to a firewall.

Having described the components of the content detection system 100, methods of using content detection system 100 in accordance with some embodiments will now be described. First, processing station 104 receives an electronic content. By means of non-limiting examples, such electronic content can be a web page, an email, an email attachment, a word file, a program, etc., and the like, e.g., a file that may contain undesirable content. In other examples, electronic content can be a virus, a spam, a worm, or any of other undesirable content. Processing station 104 can receive the electronic content from one or more sources. For example, a content detection module 108 may detect a content that is suspicious (or that requires further processing), in which case, content detection module 108 then sends the electronic content to processing station 104 for processing. Alternatively, processing station 104 can receive electronic content from a person, who sends the content to processing station 104 via email. In other embodiments, electronic content can be input into processing station 104 by a user of processing station 104.

After processing station 104 received the electronic content, processing station 104 then analyzes such information to determine whether the content contains/is a threat (e.g., a virus, a worm, a spam, etc.) that is desired to be detected. If processing station 104 determines that the electronic content contains a threat that is desired to be detected, processing station 104 then generates content detection data for the electronic content. For example, after processing station 104 received a set of content data, processing station 104 then performs an analysis using conventional or known technique(s) to determine whether it is a virus (an example of content that is desired to be detected). In some embodiments, processing station 104 is programmed to perform such analysis. Alternatively, the set of content data can be analyzed by an administrator, a separate device, or a separate software, and the result of the analysis is then input to processing station 104. If processing station 104 determines that the set of content data includes content that is undesirable (e.g., desired to be detected by content detection modules 108), processing station then generates content detection data, which can be used by content detection modules 108 to detect the undesirable content. By means of non-limiting examples, content detection data can be a virus signature, a virus definition, a spammer identification, a URL, a NIDS signature, a time at which content detection data is created, a level of threat, etc., and the like, e.g., any information that can be used in a content detection or screening process. In other embodiments, processing station 104 does not generate the content detection data. In such cases, content detection data can be provided by a separate source, and is input into processing station 104.

As soon as, or shortly after, processing station 104 obtains the content detection data, processing station 104 then transmits the content detection data to central station 102. If processing station 104 and central station 102 are implemented as a single unit, then the step of transmitting content detection data to central station 102 is omitted. In response to obtaining the content detection data, central station 102 initiates a transmission process for transmitting the content detection data to update stations 106. In the illustrated embodiments, central station 102 maintains a list of prescribed geographical areas, a list of content detection modules 108 in each prescribed geographical area, and a list of update stations 106 for serving (e.g., sending content detection data to and/or from) each prescribed geographical area. Based on the lists, central station 102 assigns update stations 106 to provide the content detection data to content detection modules 108 within the prescribed geographical areas. In some embodiments, one update station 106 is used to serve content detection modules 108 within a prescribed geographical area. Alternatively, more than one update station 106 can be used to serve content detection modules 108 within a prescribed geographical area.

In some cases, an update station 106 can be configured to check another update station 106 to determine whether it has received content detection data. For example, if update station 106a determines that update station 106b did not receive content detection data, update station 106a then sends content detection data to update station 106b. Various techniques can be used to determine whether update station 106b received content detection data. For example, in some embodiments, update station 106a is configured to send an inquiry to update station 106b. If update station 106b did not receive content detection data, update station 106b then transmits a signal or a reply to update station 106a, indicating that update station 106b did not receive content detection data. Alternatively, update station 106a is configured to initiate a timer after it has received content detection data. The timer continues to run until update station 106a receives a signal from update station 106b indicating that update station 106b received content detection data. If update station 106a does not receive such signal from update station 106b within a prescribed time period, update station 106a then determines that update station 106b did not receive the content detection data. Other techniques known in the art can also be used to check whether update station 106b received content detection data. If it is determined that update station 106b did not receive content detection data, update station 106a then sends content detection data to update station 106b. It should be noted that in other embodiments, instead of having one update station check another update station, one update station can check a plurality of other update stations. Also, in other embodiments, more than one update station 106 can check another update station 106.

In the illustrated embodiments, each of the update stations 106 are configured (e.g., pre-assigned) to serve one or more content detection module 108. For example, update station 106a can be configured to serve content detection modules 108a, 108b, update station 106b can be configured to serve content detection module 108c, and update station 106c can be configured to serve content detection modules 108d, 108e.

In other embodiments, instead of pre-assigning update stations 106 to serve certain content detection modules 108, central station 102 determines which update station 106 to use for sending content detection data based on a condition during use, e.g., based on load demands and/or capacities of update stations 106. As used in this specification, "capacity" refers to a variable that represents or associates with a level of ability for an update station 104 to handle content transmitted thereto. For example, capacity of an update station 104 can be an amount of memory space available, etc. Using the example of FIG. 1, central station 102 receives information regarding capacities of update stations 106a-106c, and selects one or more update stations 106 for transmitting content detection data based on their load and/or capacities. For example, if update station 106a has a high load demand (e.g., above a prescribed load demand) and/or if its remaining capacity to handle additional traffic is low (e.g., below a prescribed capacity threshold), central station 102 then uses update stations 106b and 106c to transmit content detection data to content detection modules 108a-108e. Load on the update stations 106b and 106c can be approximately shared in equal portion. For example, if central station 102 determines that update stations 106b and 106c are available, central station 102 can assign update station 106b to transmit content detection data to modules 108a and 108b, and update station 106c to transmit content detection data to modules 108a-108c. Alternatively, load among the available update stations 106 can be distributed based on the respective load demand and/or capacities of the available update stations 106. For example, if update stations 106b, 106c have capacities to serve twenty (20) and eighty (80) content detection modules 108, respectively, central station 102 then assign update stations 106b, 106c to transmit content detection data such that the ratio of the assigned loads approximately corresponds with the ratio of the capacities of the available update stations 106b, 106c. Following the above example, central station 102 will assign update station 106b to serve content detection module 108a, and update station 106c to serve content detection modules 108b-108e.

In other embodiments, central station 102 maintains an order list of update station 106, which prescribes an order (e.g., in a round-robin configuration) in which load is to be assigned to update stations 106. For example, the order list may have update stations 106a-106c as primary, secondary, and tertiary stations, respectively, for serving content detection modules 108a-108e. In such cases, central station 102 will initially attempt to use update station 106a (the primary station) for transmitting content detection data to content detection modules 108a-108e. However, if update station 106a is unavailable (e.g., due to heavy load demand), central station 102 will then attempt to use update station 106b (the secondary station) for transmitting content detection data to content detection modules 108a-108e. If update station 106b is unavailable (e.g., due to heavy load demand), central station 102 will then attempt to use update station 106c (the third station on the order list) for transmitting content detection data to content detection modules 108a-108e.

It should be noted that the technique for transmitting content detection data from central station 102 and/or update station(s) 106 to content detection module(s) 108 should not be limited to the examples discussed previously, and that other techniques can also be used in other embodiments. For example, one or more of the techniques described previously can be combined with another technique. Also, in other embodiments, central station 102 does not maintain the list of content detection modules 108 and the list of geographical areas. In such cases, after central station 102 receives content detection data, it transmits the content detection data to all update stations 106. The update stations 106 are configured to coordinate among themselves to ensure that all content detection modules 108 are provided with the content detection data. For example, in the example of FIG. 1, update station 106a can be configured (e.g., programmed) to communicate with update station 106b for various purposes, such as, to check a load demand on update station 106b, to check a capacity of update station 106b, to check an availability of update station 106b, and/or to verify that update station 106b has received content detection data. In some embodiments, based on the load demand and/or the capacities on the update stations 106, update stations 106 share the load among themselves (e.g., by dividing the load in equal parts, or by distributing the load based on respective ratios of the demand and/or capacities on the update stations 106) to pass the content detection data to content detection modules 108. In some embodiments, one update station 106 can be configured to communicate with one or more other update station 106. In such cases, the update station 106 can check one or more other update station 106 to make sure that content detection data have been received, and/or to serve as backup for the one or more other update station 106. In other embodiments, more than one update stations 106 can check an update station 106, and serve as backup for the update station 106.

After content detection modules 108 received the content detection data (e.g., a virus signature), content detection modules 108 can then utilize the content detection data to detect content. In some embodiments, the content detection data is a virus signature, in which case, content detection modules 108 utilizes the virus signature to detect the virus that corresponds with the virus signature. Alternatively, the content detection data is a spammer identification, in which case, content detection modules 108 utilizes the spammer identification to detect and screen undesirable spam that corresponds with the spammer identification. In other embodiments; the content detection data can be other information, such as, a time at which content detection data is created, that content detection modules 108 can use in a content detection or screening process.

Using the above method, content detection data can be provided to content detection modules 108 within a short period, such as, several minutes, and in some cases, within seconds, after the content detection data has been obtained (determined) by processing station 104 and/or central station 102. This allows content detection modules 108 to be updated in substantially real time. This is advantageous because some content detection data such as virus definitions are very time-sensitive, and should be distributed to all content detection modules 108 as soon as the content detection data are available. Also, with system 100, the responsibility to keep up with the latest security update (e.g., content detection data) is shifted from users of content detection modules 108 to processing station 104 and/or central station 102. In addition, unlike typical update method, which requires a content detection module to regularly "poll" an update station to check if there is a new update, central station 102 and/or update stations 106 "push" the latest security update data within minutes (or even seconds) after they are available to all content detection modules 108. This method has the advantage of faster response time during an outbreak and less resource consumption on content detection modules 108.

Further, using a network of update stations 106 for transmitting content detection data is reliable because if update station(s) 106 is not available or fail to work properly, a nearby update station 106 in the same prescribed geographical area or update station(s) 106 located in other prescribed geographical area can provide the content detection data to content detection modules 108. Also, with content detection system 100, an update station 106 can be added, removed from the content detection system 100 at run-time without causing service interruption. If the update stations 106 for a certain geographical areas cannot keep up with the ever-increasing load, more update station(s) can be added to the content detection system 100. As such, content detection system 100 provides high scalability.

In some embodiments, an update station can be customized to serve the need of certain organization(s). Some organizations have some special policies that restrict their network device's access to the Internet. For example, their network connection from Intranet to Internet is only limited to certain host(s). Therefore, it may not be possible for their content detection modules 108 inside the Intranet to access update station(s) 106. In such cases, a customized update station can be provided outside the Intranet of the organization (customer). For example, the customer can configure [ ] an update station to serve its own content detection module(s) 108. In some embodiments, a user interface can be provided for allowing a user to select which content detection module(s) 108 within the organization to use a customized update station and which content detection module(s) 108 to use a regular update station. As with update stations 106, more than one customized update station can be provided, and these customized update stations can back up each other and distribute their load.

Computer Architecture

As described previously, any of central station 102, processing station 104, update station 106, and content detection module 108 can be implemented using a computer. For example, one or more instructions can be imported into a computer to enable the computer to perform any of the functions described herein.

Figure 2:
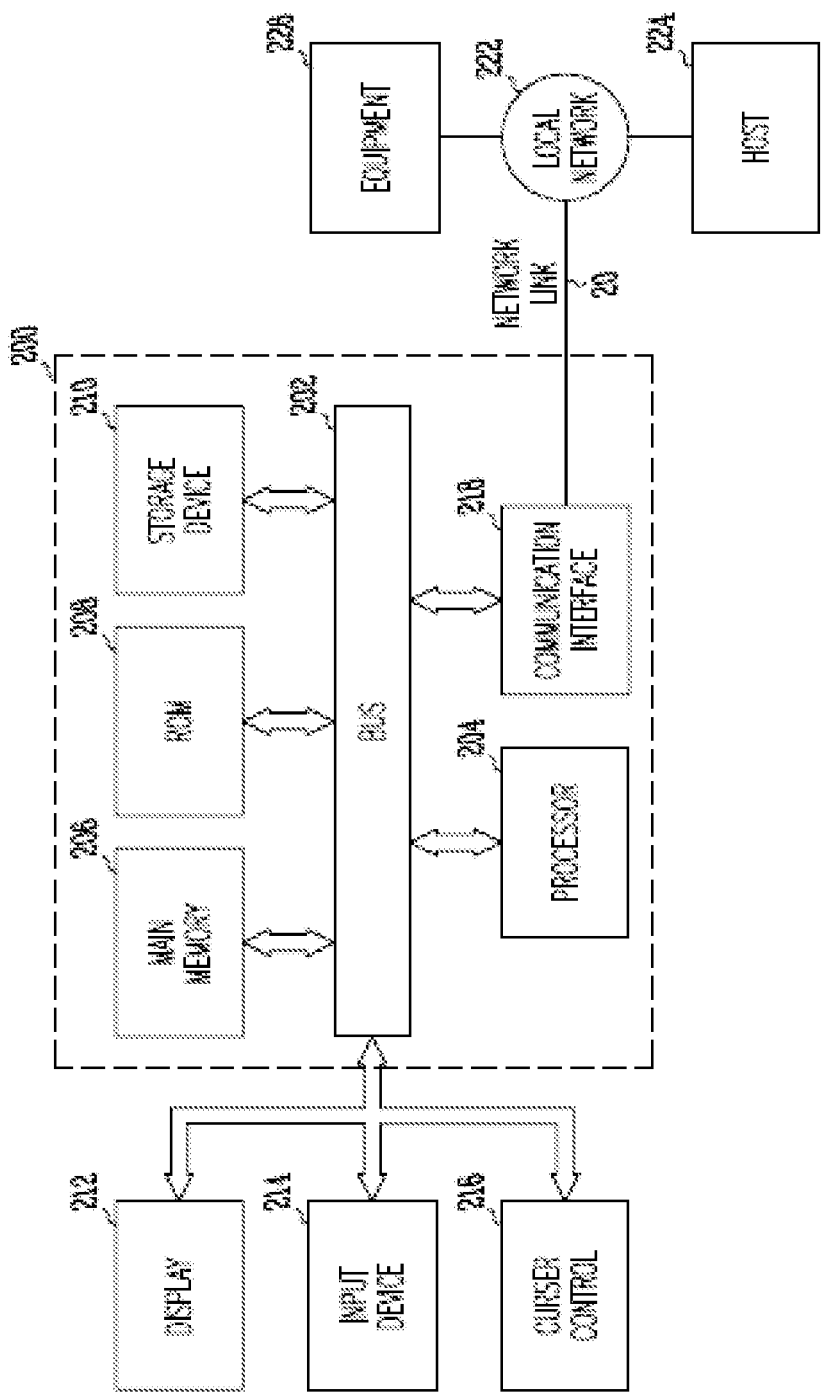
FIG. 2 is a diagram of a computer hardware system.

FIG. 2 is a block diagram that illustrates an embodiment of a computer system 200 upon which embodiments of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 may further include a read only memory (ROM) 208 or other static storage device(s) coupled to bus 202 for storing static information and instructions for processor 204. A data storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a user. An input device 214, including alphanumeric and other keys, is coupled to bus 202 for communicating information and command selections to processor 204. Another type of user input device is cursor control 216, such as a mouse, a trackball, cursor direction keys, or the like, for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Embodiments of the invention are related to the use of computer system 200 for transmitting content data. According to some embodiments of the invention, such use may be provided by computer system 200 in response to processor 204 executing one or more sequences of one or more instructions contained in the main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry data streams representing various types of information.

Network link 220 typically provides data communication through one or more networks to other devices. For example, network link 220 may provide a connection through local network 222 to a host computer 224. Network link 220 may also transmits data between an equipment 226 and communication interface 218. The data streams transported over the network link 220 can comprise electrical, electromagnetic or optical signals. The signals through the various networks and the signals on network link 220 and through communication interface 218, which carry data to and from computer system 200, are exemplary forms of carrier waves transporting the information. Computer system 200 can send messages and receive data, including program code, through the network (s), network link 220, and communication interface 218. Although one network link 220 is shown, in alternative embodiments, communication interface 218 can provide coupling to a plurality of network links, each of which connected to one or more local networks. In some embodiments, computer system 200 may receive data from one network, and transmit the data to another network. Computer system 200 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A content detection system comprising:
   at least one processor;
   at least one memory device;
   at least one network interface device;
   content detection and configuration data stored on the at least one memory device;
   an instruction set, stored in the at least one memory device and executable by the at least one processor to:
      receive network traffic via the at least one network interface device;
      process the received network traffic in view of the content detection and configuration data stored in the at least one memory device to determine whether the network traffic content complies with policies defined at least in part by the content detection and configuration data, wherein the determining of policy compliance includes user identification, content identification, and at least one of source verification and destination verification;
      when the network traffic content is determined to not be compliant with the policies:
         generate content detection data as a function of at least a portion of data included in the network traffic content;
         store the generated content detection data on the at least one memory device;
         determine an update station for receiving the content detection data; and
         transmit, via a network interface device, the content detection data and data identifying at least one content detection module to receive the content detection data to the update station not in response to a request from the update station or a content detection module.

2. The content detection system of claim 1, wherein the content detection system is a central station.

3. The content detection system of claim 2, wherein the central station is configured to select an update station of a plurality of update stations to be the first update to which the central station transmits the content detection data.

4. The content detection system of claim 1, wherein the content detection data defines malicious content.

5. The content detection system of claim 1, wherein processing the received network traffic content in view of the content detection data and configuration data to determine whether the network traffic content complies with policies defined at least in part by the content detection and configuration data includes determining whether the network traffic content includes suspicious content in need of further processing, the instruction set including further instructions executable by the at least one processor to:
   provide the network traffic content to an analysis process that will perform analysis on network traffic content to determine whether the network traffic content contains a threat desired to be detected and, when the network traffic content is determined to contain a threat desired to be detected, generates content detection data for detecting the threat in subsequently received network traffic content.

6. The content detection system of claim 5, wherein the analysis process, to which the network traffic content is provided, executes on a distinct computing device.

7. The content detection system of claim 6, wherein the analysis process facilitates an analysis that includes receiving administrator input.

8. A non-transitory computer-readable medium with instructions stored thereon which when executed by at least one processor of a computing device, causes the computing device to:
- receive network traffic content that includes suspicious content;
- perform analysis on the network traffic content to determine when the network traffic content contains a threat desired to be detected;
- when the network traffic content is determined to contain a threat desired to be detected, generate content detection for content detection modules to detect the threat in subsequently received network traffic content;
- store the content detection data on a data storage device;
- determine an update station for receiving the content detection data; and
- transmit, via a network interface device, the content detection data and data identifying at least one content detection module to receive the content detection data to the update station not in response to a request from the update station or a content detection module.

9. The non-transitory computer-readable medium of claim 8, wherein the network traffic content is received via a network interface device and was determined by a content detection module to include suspicious content.

10. The non-transitory computer-readable medium of claim 8, wherein the network traffic content is received via the network interface device from the content detection module that determined the network traffic content includes the suspicious content.

11. The non-transitory computer-readable medium of claim 8, wherein performing the analysis on the network traffic content to determine whether the network traffic content includes a threat desired to be detected includes receiving administrator input.

12. The non-transitory computer-readable medium of claim 8, wherein the generated content detection data is at least one of a virus signature, a virus definition, a spammer identification, and a URL.

13. A method comprising:
- receiving network traffic content that includes suspicious content;
- performing analysis on the network traffic content to determine when the network traffic content contains a threat desired to be detected;
- when the network traffic content is determined to contain a threat desired to be detected, generating content detection for content detection modules to detect the threat in subsequently received network traffic content;
- storing the content detection data on a data storage device;
- determining an update station for receiving the content detection data; and
- transmitting, via a network interface device, the content detection data and data identifying at least one content detection module to receive the content detection data to the update station not in response to a request from the update station or a content detection module.

14. The method of claim 13, wherein the network traffic content is received via a network interface device and was determined by a content detection module to include suspicious content.

15. The method of claim 13, wherein the network traffic content is received via the network interface device from the content detection module that determined the network traffic content includes the suspicious content.

16. The method of claim 13, wherein performing the analysis on the network traffic content to determine whether the network traffic content includes a threat desired to be detected includes receiving administrator input.

* * * * *